United States Patent [19]

Black et al.

[11] 4,408,324

[45] Oct. 4, 1983

[54] NOISE SIGNAL LEVEL CONTROL IN A TASI SYSTEM

[76] Inventors: David H. A. Black, Box 28, R.R. 1, Chelsea, Quebec, Canada, J0X 1N0; Georges H. Pelletier, 225 des Voyageurs, Aylmer, Quebec, Canada, J9J 1P8

[21] Appl. No.: 218,751

[22] Filed: Dec. 22, 1980

[30] Foreign Application Priority Data

Oct. 3, 1980 [CA] Canada .................................. 361496

[51] Int. Cl.³ .......................... H04J 6/02; H04M 9/10
[52] U.S. Cl. ...................................... 370/81; 179/1 P
[58] Field of Search ....................... 370/81, 82, 83, 84; 179/1 CN, 1 H, 1 P, 1 VC

[56] References Cited

U.S. PATENT DOCUMENTS 4,059,730 11/1977 Messerschmitt et al. ............. 370/81
4,123,620 10/1978 Karlsson .......................... 179/1 CN Primary Examiner—Thomas A. Robinson

[57] ABSTRACT

Speech signals from a plurality of channels are interpolated in a TASI system for transmission via a lesser plurality of transmission facilities, such as telephone tie-lines which carry analog voice frequency signals. Recurrently, the level of noise received via each facility is measured at a receiver of the system while the facility is idle. An average of the monitored noise levels for all facilities, which is recurrently updated, is used to control the level of a noise signal which is supplied by the receiver to each off-hook channel for which speech signals are not being received via the facilities.

7 Claims, 3 Drawing Figures

NOISE SIGNAL LEVEL CONTROL IN A TASI SYSTEM

This invention relates to a method of mitigating noise signal contrast in a TASI (time assignment speech interpolation) system, and to a TASI system incorporating this method.

In a TASI system, speech signals from a plurality of channels are interpolated for transmission via a lesser plurality of transmission facilities. At a receiver of the system, the speech signals received via the facilities are supplied to their respective channels. Thus each channel is recurrently connected to a facility for the transmission of its speech signals, and is disconnected from the facility when the channel becomes inactive, for example during a pause in the speech signals. The connection and disconnection of the channel gives rise to a noise signal contrast, which is audible to a subscriber using the channel, in that noise on the channel when it is connected to a facility is removed during the disconnected periods.

In order to reduce this noise signal contrast, it is known to provide a noise signal generator in the receiver, and to supply a noise signal from this generator to each channel during the channel's disconnected periods, when signals for the channel are not being received via the facilities. In such an arrangement, the noise signal level supplied to the channels is initially set to a desired level and constantly remains at this level during operation of the TASI system. Consequently, variations in noise levels which occur during operation of the system are not accommodated, so that the noise signal contrast may still be sufficient to be noticeable.

In order to compensate for varying noise levels which occur on the different channels connected to a TASI system, there is described in Messerschmitt et al U.S. Pat. No. 4,059,730 issued Nov. 22, 1977, an arrangement in which a noise estimator is provided at the TASI system transmitter to estimate the noise level of each calling trunk, or channel, during its inactive periods, and a measure of the noise level is transmitted to the TASI system receiver to adjust the noise level generated at the receiver for that channel. However, this Patent relates to a digital speech interpolation (DSI) system in which the transmission facilities are constituted by t.d.m. channels on a digital transmission link via which the interpolated speech signals are transmitted in digital form. In such a system, the noise levels on the channels at the receiving end of the system arise predominantly from the noise levels already existing on the channels at the transmitting end of the system rather than from the TASI system itself, which because it employs digital transmission is relatively immune to noise signals. In contrast, in a TASI system in which the transmission facilities are analog voice frequency signal transmission facilities, such as telephone tie-lines between PABXs, a significant part of the noise levels on the channels at the receiving end of the system arises from the TASI transmission facilities.

Accordingly, an object of this invention is to provide an improved method of mitigating noise signal contrast in a TASI system, in particular where the transmission facilities are analog voice frequency signal transmission facilities.

According to this invention there is provided a method of mitigating noise signal contrast in a TASI system in which speech signals from a plurality of channels are interpolated and transmitted via a lesser plurality of transmission facilities, said method comprising the steps of: monitoring the level of noise received at a receiver of the system via each facility while the facility is idle; producing a noise signal with a level which is controlled in dependence upon the average monitored level of noise received via said facilities; and supplying the controlled level noise signal to off-hook channels for which speech signals are not being received via the facilities.

Preferably the step of producing the controlled level noise signal comprises the steps of: generating a noise signal; determining the average of the monitored levels of noise received via said facilities; and limiting the level of the generated noise signal to a predetermined amount less than the determined average of the monitored levels to produce the controlled level noise signal. The predetermined amount is conveniently about 3 dB.

Preferably the level of noise received via each facility while the facility is idle is recurrently monitored for each facility and the controlled level of the produced noise signal is recurrently updated in dependence upon the recurrent monitoring. The recurrent monitoring ensures that the noise level supplied to the channels is adaptively adjusted to accommodate variations in the noise levels on the facilities. The monitoring of the noise levels on the facilities can conveniently be effected sequentially for the facilities at times when transmission of speech signals via the TASI system will not be adversely affected by having one of the facilities idle.

Preferably the step of monitoring the level of noise received via each facility comprises averaging the noise level received via the facility over a predetermined period while the facility is idle.

The invention also extends to a TASI system in which speech signals from a plurality of channels are interpolated and transmitted via a lesser plurality of transmission facilities, said system comprising: monitoring means for monitoring the level of noise received via each facility while the facility is idle; a noise signal generator; control means for controlling the level of a noise signal produced by the noise signal generator in dependence upon the average monitored level of noise received via said facilities; and means for supplying the controlled level noise signal to off-hook channels for which speech signals are not being received via the facilities.

The invention will be further understood from the following description with reference to the accompanying drawings, in which.

Figure 1:
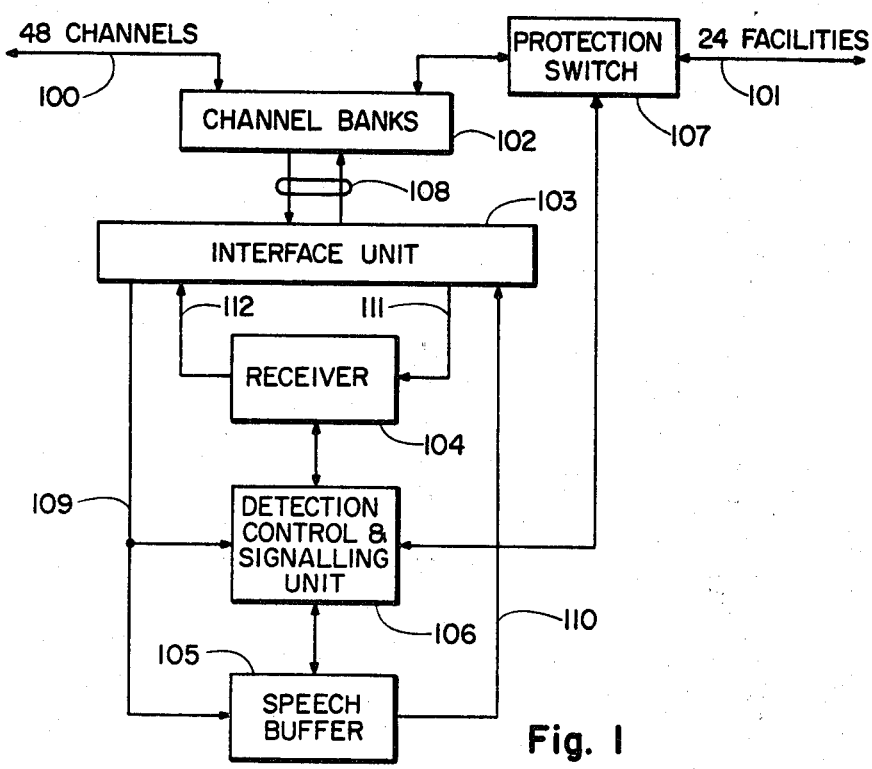
FIG. 1 illustrates in a simplified block diagram a TASI system incorporating an embodiment of the invention.

Referring to FIG. 1, there is shown therein in simplified form a TASI system which enables transmission of signals from up to 48 channels 100, connected for example to a PABX (not shown), via up to 24 transmission facilities 101, e.g. telephone tie-lines connected at their far end (not shown) via another, similar, TASI system to another PABX. The channels 100 and facilities 101 are coupled via up to three channel banks 102 and an interface unit 103 to a receiver 104, a speech buffer 105, and a detection, control, and signalling unit 106. The facilities 101 are coupled to the channel banks 102 via a protection switch 107, which under the control of the unit 106 couples a selected one of the facilities 101, constituting an order wire, to the unit 106 for the transmission of signalling and assignment information and commands and messages. The manner in which this transmission is accomplished forms the subject of copending U.S. patent application Ser. No. 218,683, entitled "TASI System Including an Order Wire", filed simultaneously herewith, the entire disclosure of which is incorporated herein by reference.

The channel banks 102 operate in known manner to convert between bi-directional voice frequency signals, on the channels 100 and facilities 101, and unidirectional 1.544 Mb/s digital bit streams (in the standard DSI format) on lines 108 leading to and from the interface unit 103. The interface unit 103 supplies speech signals from the channels, incoming on the lines 108, via lines 109 to the unit 106 and the speech buffer 105. The unit 106 detects speech signals of active channels and controls the buffer 105 so that these signals are interpolated for transmission via the facilities 101, the interpolated speech signals being conducted from the buffer 105 to the facilities 101 via lines 110, the interface unit 103, the lines 108, the channel banks 102, and the protection switch 107. The manner in which the speech buffer operates and the speech signal interpolation is effected forms the subject of copending U.S. patent application Ser. No. 218,756, entitled "Buffering Speech Signals in a TASI System", filed simultaneously herewith, the entire disclosure of which is incorporated herein by reference.

In the opposite transmission direction, interpolated speech signals incoming on the facilities 101 are conducted via the protection switch 107, channel banks 102, lines 108, interface unit 103, and lines 111 to the receiver 104, which in accordance with assignment information supplied by the unit 106 couples the interpolated speech signals to their respective channels 100 via lines 112, the interface unit 103, lines 108, and the channel banks 102. The receiver 104 also produces and supplies to inactive channels, i.e. channels which are off-hook but for which speech signals are not being received via the facilities, a noise signal as described in detail below. This insertion of the noise signal on the inactive channels is effected in order to avoid an aural "too-quiet" condition on the channels which for the time being are not connected to the facilities 101. The present invention is concerned with the production of the noise signal at an appropriate level.

The interface unit 103 generates timing signals which control the timing of the 1.544 Mb/s bit streams on the lines 108. As is known, each of these bit streams consists of 125 μs frames each comprising a frame bit and an 8-bit PCM signal sample of each of 24 voice frequency channels. During each frame, the interface unit 103 supplies to the lines 109, and receives from the lines 112, an 8-bit signal sample in respect of each of the channels 100, each 8-bit signal sample being presented in parallel on the lines 109 or 112 during a 2.6 μs period during which the interface unit produces a 6-bit address which identifies the respective channel. This 6-bit address is referred to herein as the channel address. Similarly, during each frame the interface unit 103 supplies to the lines 111, and receives from the lines 110, an 8-bit parallel signal sample in respect of each of the facilities 101 used for the transmission of interpolated voice frequency signals. Each sample is presented on the lines 111 or 110 during a 5.2 μs period during which the five most significant bits of the channel address, referred to herein as the facility address, identify the respective facility 101.

Figure 2:
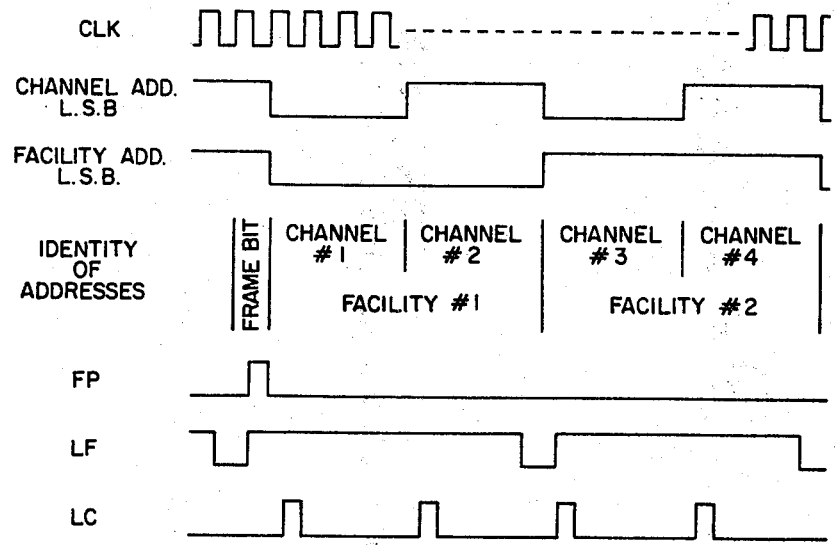
FIG. 2 shows timing signals which occur in operation of the system.

FIG. 2 shows timing signals including a 1.544 MHz clock CLK and the least significant bits (L.S.B.) of the channel address and the facility address, and also indicates the identity of the channels and facilities identified by these addresses. As can be seen from FIG. 2, during a frame bit, which is produced once in every 125 μs frame, a pulse of a signal FP is produced. Throughout the remaining 192 bits of each frame, the channel and facility addresses identify respective ones of the channels and facilities. The signal FP, and signals LF and LC which are also shown in FIG. 2, are referred to below with reference to FIG. 3.

Figure 3:
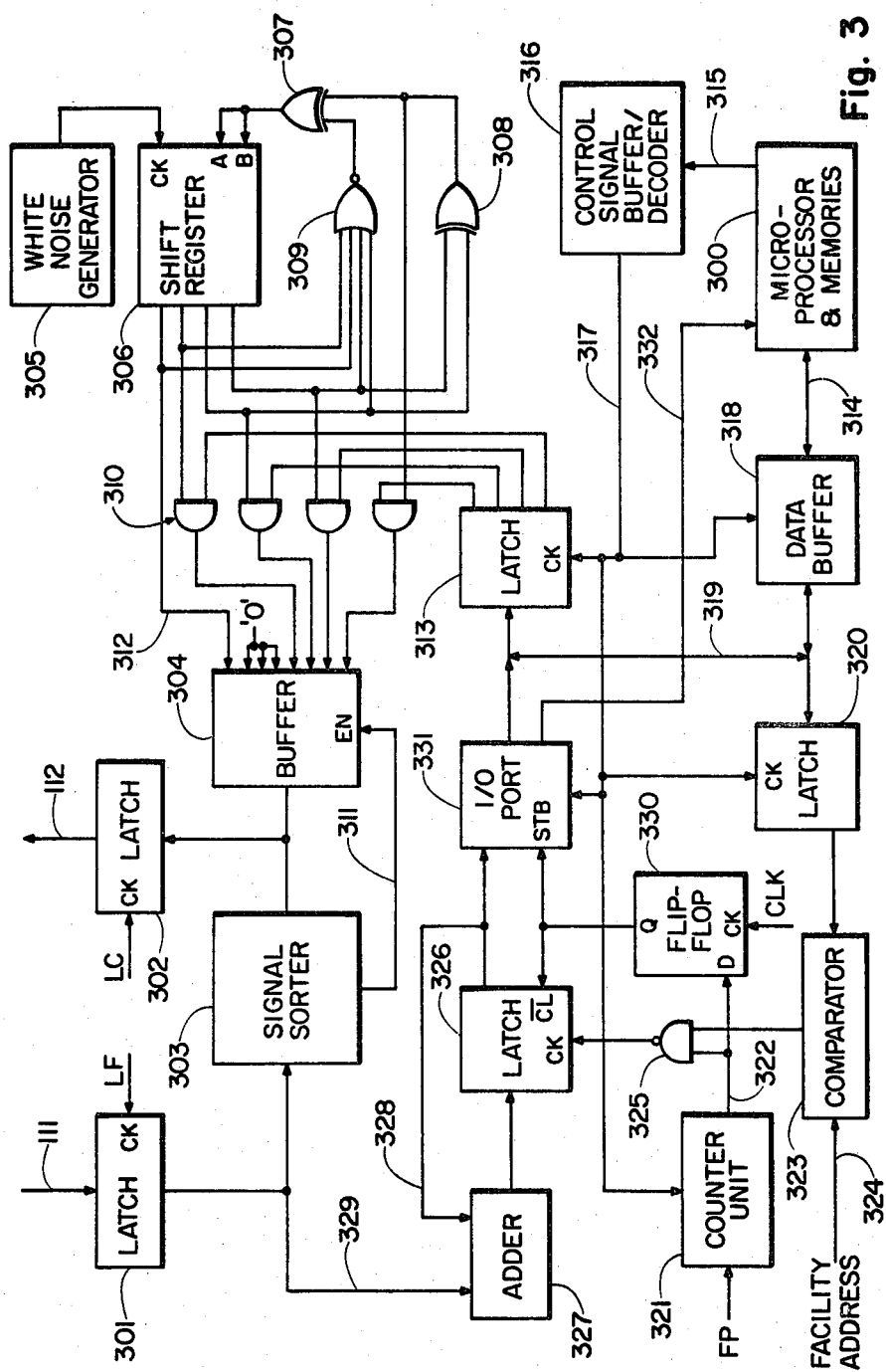
FIG. 3 illustrates parts of a receiver of the TASI system.

FIG. 3 illustrates parts of the receiver 104, and also illustrates in a single block 300 a microprocessor and memories which form part of the unit 106. As shown in FIG. 3, the receiver 104 comprises latches 301 and 302 having clock inputs CK to which the signals LF and LC, respectively, are applied, a signal sorter 303, a buffer 304, and a noise signal generator comprising a white (broad-band) noise generator 305, a type 74LS164 shift register 306, Exclusive-OR gates 307 and 308, a NOR gate 309, and four AND gates 310. Other parts of the receiver shown in FIG. 3 serve for setting the noise signal level and are described below.

Each 8-bit PCM signal sample incoming from one of the facilities 101 is latched in the latch 301 with the signal LF during the relevant facility address, and is supplied to the signal sorter 303. The signal sorter 303, which is described in detail in the copending patent application entitled "TASI System Including an Order Wire" already referred to, stores the signal sample in a random access memory, (RAM, not shown) within the sorter 303 at a location allocated to the channel which is currently assigned to the relevant facility. Assignment and control information is supplied to the sorter 303 via lines not shown in FIG. 3. During the next occurrence of the channel address of the channel currently assigned to the facility, the 8-bit PCM signal sample is read out from the RAM and is latched in the latch 302 with the signal LC. The output of the latch 302 is coupled to the lines 112, either directly as shown for simplicity in FIG. 3, or via an attenuating ROM (read-only memory) for echo suppression and a signalling bit inserter as described in the copending patent application referred to above.

Thus speech signals of active channels, which signals are received via the facilities 101, are supplied from the receiver 104 to the respective channels. For inactive channels, i.e. channels which are connected to off-hook subscribers who are temporarily silent, during each respective channel address the sorter 303 supplies a signal via a line 311 to an enable input EN of the buffer 304. In consequence, the buffer 304 is enabled to supply a noise signal from the noise signal generator to the latch 302, the noise signal being latched in the latch 302 instead of a PCM signal sample.

The noise signal is constituted by the output of a pseudo-random signal generator, constituted by the shift register 306 and gates 307 to 309 which are connected as shown, which is clocked by the output of the white noise generator 305, modified in level or amplitude by the gates 310. As shown in FIG. 3, one output of the shift register 306 is connected directly to an input of the buffer 304 via a line 312; signals on this line constitute the sign bit of the noise signal. The four least significant magnitude bits of the noise signal are constituted by signals supplied to the buffer 304 from the outputs of the AND gates 310, each of which is supplied with a respective signal from the pseudo-random signal generator and with a respective level control signal from a latch 313. The remaining three inputs of the buffer, corresponding to the three most significant magnitude bits of the noise signal, are supplied with a logic zero.

Thus a four-bit word, contained in the latch 313, controls the level of the noise signal which is inserted by the receiver on each inactive channel. This noise signal level is adaptively adjusted to be 3 dB lower than the average noise level of the facilities 101, so that the connections and disconnections between the channels and the facilities, which occur in operation of the TASI system, are less likely to be noticed by subscribers connected to the channels, and to minimize increases in activity in TASI systems connected in tandem.

Accordingly, the receiver 104 also includes means for measuring the broadband noise level on each facility while the facility is idle. This measurement is effected as follows:

The unit 106 in the TASI system at the far end of the facilities 101 selects, on a routine basis, for example about every 5 seconds, a facility whose noise level is to be measured, and for a temporary period of 64 ms causes no signals to be supplied to the selected facility. It also transmits via the order wire a message identifying the facility and indicating that the noise level on the facility is to be measured. In response to this message the microprocessor 300 supplies the address of the facility on data lines 314, and supplies signals via address and control signal lines 315 to a control signal buffer and decoder unit 316, which in response thereto, via control lines 317, causes a bi-directional data buffer 318 to supply the facility address from the data lines 314 to a data bus 319. In addition, via the lines 317 the unit 316 supplies a signal to a clock input CK of a latch 320 to cause the facility address to be latched therein, and supplies a signal to a counter unit 321 to enable the counter unit to start counting pulses of the signal FP, which pulses as already described occur once every 125 $\mu$s frame. The counter unit 321 is arranged, when enabled to start counting, to count 128 pulses of the signal FP and then to be reset to a count of zero, and to produce on an output line 322 a logic 0 for a count of 0 and a logic 1 for counts from 1 to 128 inclusive. Thus a logic 1 is produced on the line 322 for 128 frames, or a period of 16 ms.

A comparator 323 compares the current facility address, supplied thereto via lines 324, with the facility address contained in the latch 320, and when the compared addresses are the same, once in each frame, supplies a logic 1 to one input of a 2-input NAND gate 325, the other input of which is connected to the line 322 and the output of which is connected to a clock input CK of a 14-bit latch 326. In consequence, once in each frame for 128 frames while a logic 1 is present on the line 322, the latch 326 latches the output of a 14-bit adder 327. This output is the sum of the previous amount stored in the latch 326 and present on lines 328, and the 7-bit magnitude of the noise signal present on the idle facility being monitored, this magnitude being supplied to the adder 327 from the output of the latch 301 via lines 329. The latch 326 and adder 327 thus form an accumulator for producing the sum over 128 frames of the noise signal magnitude on the relevant facility.

After 128 frames the signal on the line 322 becomes a logic 0 as already described, inhibiting the gate 325 so that the latch 326 is no longer clocked. This logic 0 is clocked through a D-type flip-flop 330 with the 1.544 MHz clock signal CLK applied to its clock input CK, to produce a logic 0 at its output Q. This logic 0 is applied to a strobe input STB of an input/output port 331 to cause the eight most significant bits of the sum contained in the latch 326, representing an average of the noise signal on the facility, to be stored in the I/O port 331 and to cause an interrupt signal to be supplied from the I/O port 331 to the microprocessor 300 via a line 332, and is also applied to a clear input CL of the latch 326 to cause the sum to be cleared from the latch. In response to the interrupt signal, via the lines 315, unit 316, and lines 317 the microprocessor 300 controls the I/O port 331 to supply the stored 8-bit noise level signal to the data bus 319 and controls the data buffer 318 to supply this signal to the microprocessor 300 via the lines 314, the microprocessor storing this signal in its memories.

Thus the noise level on one of the facilities 101 is measured, the facility being idle during the 16 ms measurement period and, at the end of the 64 ms idle period (which is selected to provide an ample guard time to ensure that the facility is idle throughout the measurement period), again being available for the transmission of speech signals. As already described, the noise level of each of the facilities which is being used for the transmission of speech signals is measured in the same manner on a routine basis. Thus over a period of time, the microprocessor 300 is supplied with the average noise level on each facility being used, each average being recurrently updated.

From the average noise level on each facility, the microprocessor 300 produces the 4-bit word which controls the level of the noise signal which is inserted on the inactive channels. Having produced this 4-bit word as described below, the microprocessor 300 supplies this word to the data lines 314 and via the lines 315, unit 316, and lines 317 causes this word to be supplied via the data buffer 318 to the data bus 319 and to be latched in the latch 313 by a signal applied to its clock input CK. Thus the inserted noise signal level is controlled as already described.

The 4-bit noise signal level control word is produced as follows: In response to the completion of each measurement of the noise level on a facility, in the microprocessor and memories 300 the average noise level supplied via the data lines 314 is compared with the previously stored average noise level of the same facility. If the compared levels are the same, no action is taken. If the compared levels are different, the new average noise level of the facility is stored and a total average noise level of all the facilities being used is modified by the difference. This total is divided by the number of facilities being used, and the result is decreased by an amount corresponding to a noise level decrease of about 3 dB. This decrease serves to set the peak noise level inserted on the channels to a level 3 dB less than the average noise level on the facilities, and can be effected by addressing a random access memory (RAM) with the division result to read out the desired 4-bit control word, which is then latched in the latch 313 as already described. These operations are most conveniently effected by appropriate programming of the microprocessor 300, but they could alternatively be effected using separate components such as a comparator, arithmetic logic unit, and RAMs.

Although a particular embodiment of the invention has been described and illustrated, it should be appreciated that numerous modifications, adaptations, and variations may be made without departing from the scope of the invention as defined by the claims. In particular, but not by way of limitation, it is noted that the invention is applicable to TASI systems other than that referred to above.

What is claimed is:

1. A method of mitigating noise signal contrast in a TASI system in which speech signals from a plurality of channels are interpolated and transmitted via a lesser plurality of transmission facilities, said method comprising the steps of:

monitoring the level of noise received at a receiver of the system via each facility while the facility is idle;

producing a noise signal with a level which is controlled in dependence upon the average monitored level of noise received via said facilities; and supplying the controlled level noise signal to off-hook channels for which speech signals are not being received via the facilities.

2. A method as claimed in claim 1, wherein the step of producing the controlled level noise signal comprises the steps of:

generating a noise signal;

determining the average of the monitored levels of noise received via said facilities; and limiting the level of the generated noise signal to a predetermined amount less than the determined average of the monitored levels to produce the controlled level noise signal.

3. A method as claimed in claim 2 wherein said predetermined amount is about 3 dB.

4. A method as claimed in claim 1, 2, or 3 wherein the level of noise received via each facility while the facility is idle is recurrently monitored for each facility and the controlled level of the produced noise signal is recurrently updated in dependence upon the recurrent monitoring.

5. A method as claimed in claim 1, 2, or 3 wherein the step of monitoring the level of noise received via each facility comprises averaging the noise level received via the facility over a predetermined period while the facility is idle.

6. A method as claimed in claim 1, 2, or 3 wherein said transmission facilities are analog voice frequency signal transmission facilities.

7. A TASI system in which speech signals from a plurality of channels are interpolated and transmitted via a lesser plurality of transmission facilities, said system comprising:

monitoring means for monitoring the level of noise received via each facility while the facility is idle;

a noise signal generator;

control means for controlling the level of a noise signal produced by the noise signal generator in dependence upon the average monitored level of noise received via said facilities; and means for supplying the controlled level noise signal to off-hook channels for which speech signals are not being received via the facilities.

* * * * *

UNITED STATES PATENT AND TRADEMARK OFFICE
CERTIFICATE OF CORRECTION

PATENT NO. : 4,408,324
DATED : October 4, 1983
INVENTOR(S) : BLACK et al

It is certified that error appears in the above-identified patent and that said Letters Patent are hereby corrected as shown below:

In the Heading of the Patent, change "[76] Inventors:" to --[75] Inventors:--;

After the category "[75] Inventors:" insert --[73] Assignee: Northern Telecom Ltd., Montreal, Quebec, Canada--.

Signed and Sealed this

Third Day of July 1984

[SEAL]

Attest:

Attesting Officer

GERALD J. MOSSINGHOFF

Commissioner of Patents and Trademarks